Oct. 31, 1933.  J. F. PERKINS  1,932,985
CAN WEIGHING MACHINE
Filed Sept. 17, 1930  3 Sheets-Sheet 1
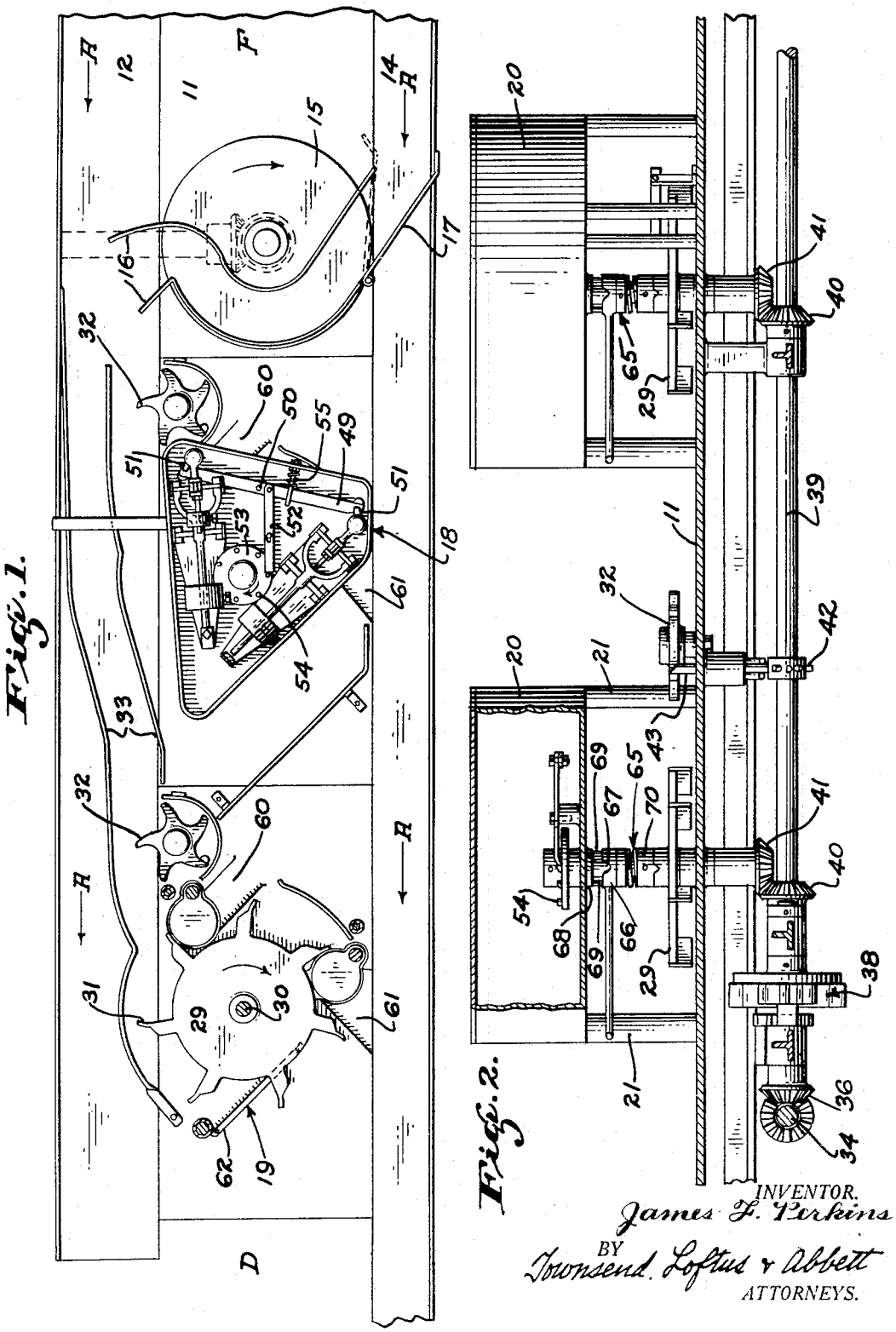
INVENTOR.
James F. Perkins
BY Townsend, Loftus & Abbett
ATTORNEYS.

Oct. 31, 1933.  J. F. PERKINS  1,932,985
CAN WEIGHING MACHINE
Filed Sept. 17, 1930  3 Sheets-Sheet 2

INVENTOR.
James F. Perkins
BY Townsend, Loftus & Abbett
ATTORNEYS.

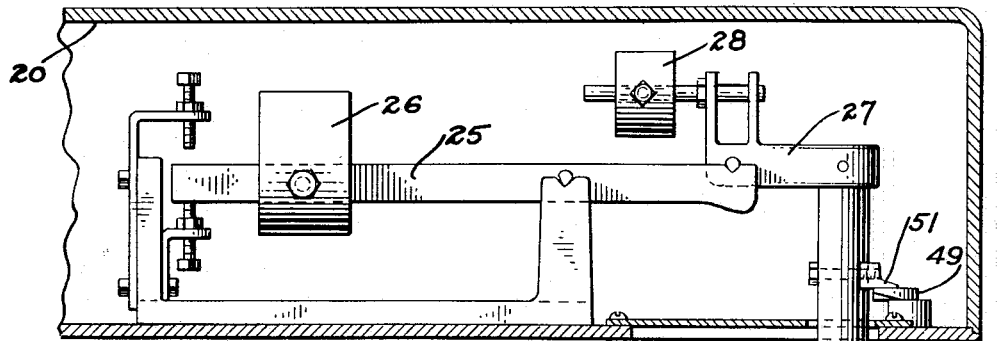
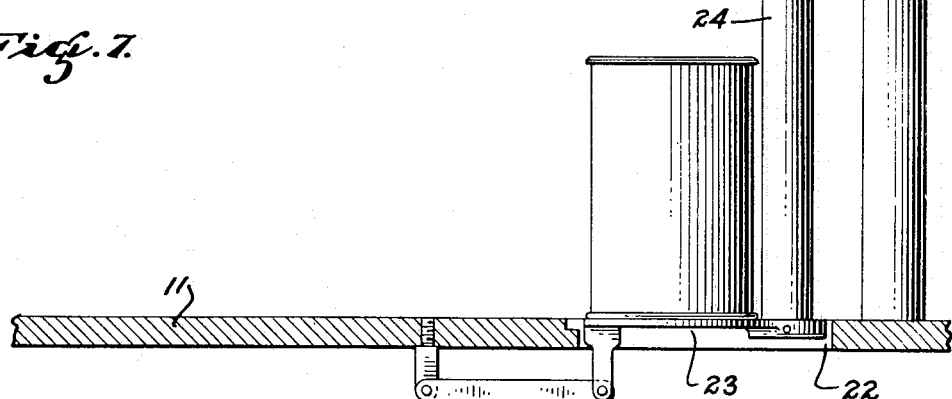
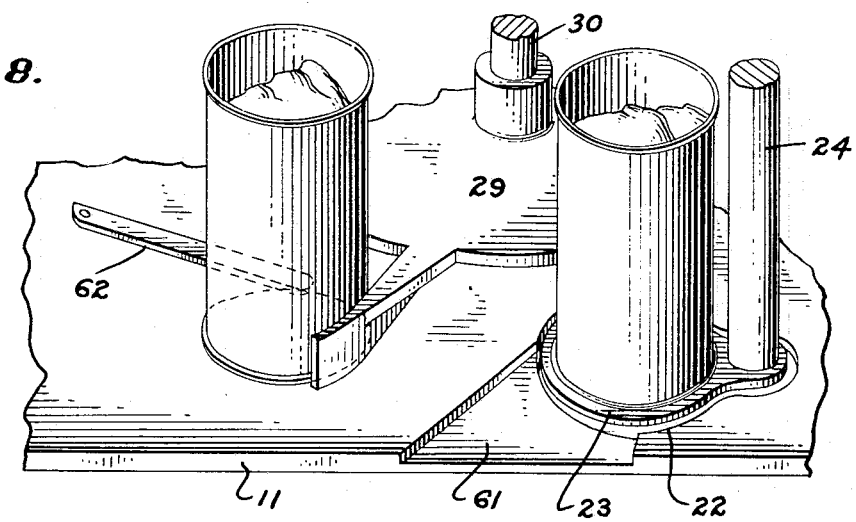

Patented Oct. 31, 1933

1,932,985

UNITED STATES PATENT OFFICE 1,932,985

CAN WEIGHING MACHINE

James F. Perkins, Hayward, Calif., assignor to Alaska Packers Association, San Francisco, Calif., a corporation of California Application September 17, 1930
Serial No. 482,464

1 Claim. (Cl. 209—121)

This invention relates to can weighing machines.

It is the principal object of the present invention to provide a generally improved automatic machine of the character referred to which is capable of rapidly and accurately segregating cans of different predetermined weights from a supply of cans continuously delivered thereto.

In carrying the invention into practice, I provide a machine to which cans are continuously delivered and which is provided with scale platforms upon which cans are singly delivered in rapid succession. These scale platforms are so relatively adjusted that cans of different predetermined weights will be automatically segregated thereby. When the cans are positioned on the scale platforms, the latter are held stationary so that accurate determination of the weight of the can positioned thereon may be had.

One form which the invention may assume is exemplified in the following description and illustrated by way of example in the accompanying drawings, in which:

Fig. 1 is a view in plan partially in section of a machine embodying the preferred form of my invention.

Fig. 2 is an enlarged fragmentary view in side elevation of the machine with parts thereof in section to more clearly disclose certain features of construction.

Fig. 7 is an enlarged fragmentary view in section showing one of the scales of the weighing units.

Fig. 8 is an enlarged fragmentary view in perspective disclosing the manner in which the cans are delivered to different points through cooperation of the scale platforms and trackways in the table.

Figure 3:
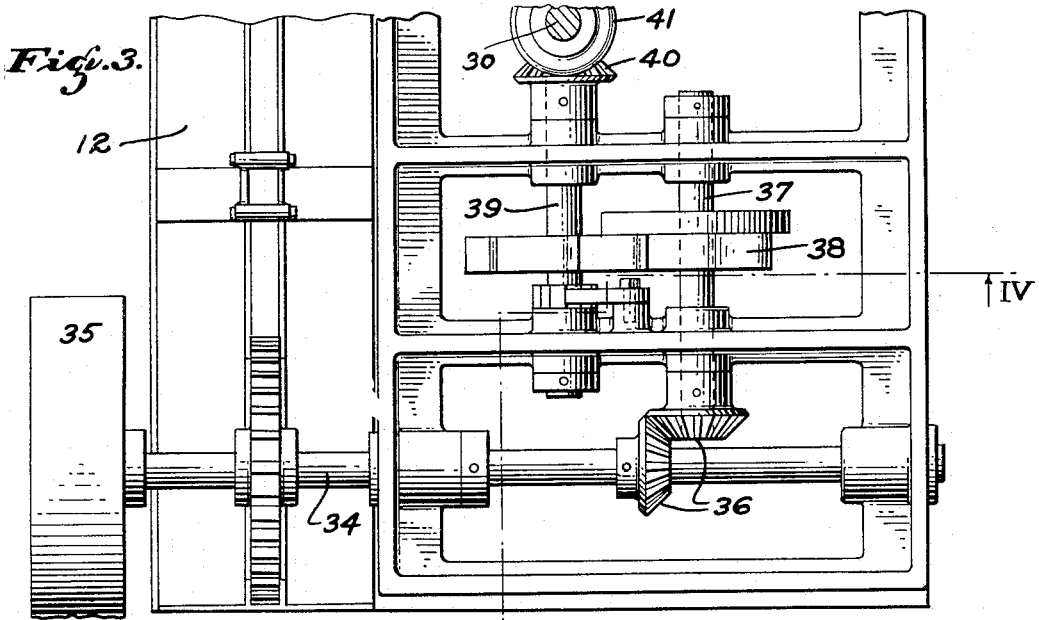
Fig. 3 is an enlarged fragmentary view in plan section disclosing the driving mechanism for the operating parts of the machine.

Referring more particularly to the accompanying drawings, I have disclosed a weighing machine which is particularly adapted for weighing filled cans as they are delivered from the filling and seaming machines. The present weighing machine is particularly provided for the purpose of automatically segregating the cans of a predetermined weight from those of lesser and greater weight. The weighing machine illustrated is designed to be placed in the line so that the run of cans through the cannery will be uninterrupted.

Referring more particularly to Figs. 1 and 2, 11 indicates a horizontal table which is elongated and at opposite sides of which are arranged conveyors 12 and 14 the upper flights of which extend parallel to the table and in substantially the same plane as the top of the table 11. The end F of the table is what I prefer to term the feed end while the end D is what I prefer to term the discharge end of the machine.

Arranged intermediate the two conveyors 12 and 14 at the feed end of the machine is a transfer disk 15 which revolves in a clockwise direction continuously as indicated by the arrow in Fig. 1. Arranged adjacent this disk is a guideway 16 which is of such a contour that under normal circumstances cans conveyed in the direction of the arrows A on the conveyor 14 will be guided by the guideway 16 onto the upper flight of the conveyor 12, and thence to the weighing units. The guideway 16, however, is provided with a hinged gate 17 which may be positioned as shown in dotted lines in Fig. 1 so as to divert the cans from the guideway 16 so that they will not enter the machine but will travel continuously along the conveyor 14. This provision is made so that in the event of the operation of the weighing machine being discontinued for any reason the run of cans along the line will not be interrupted.

Supported by the table 11 are two weighing units 18 and 19 which are identical in construction and therefore the operation of but one of these units will be described. It will suffice to state that two or more of these units may be arranged on the table in proportion to the number of cans being fed to the conveyors 12 and 14 for weighing.

Each weighing unit comprises a housing 20 arranged on supports 21 above the table. Below this housing the table 11 is formed with a pair of openings 22 in each of which a scale platform 23 is reciprocable. Each scale platform is fixed on a vertical rod 24 which extends upwardly within the housing 20. Arranged within the housing is a pivotal scale beam 25 having a weight 26 thereon at one side of its pivotal point. At the other side of its pivotal point the arm 25 engages an offset arm 27 secured at the upper end of the rod 24. This offset arm 27 also carries a weight 28, the weights 26 and 28 both being adjustable. It is my purpose to compensate for the tendency toward pivotal movement caused by the weight of the platform and its associate mechanism by means of the weight 28 while the weight 26 is for the purpose of enabling determination of the weight of an object disposed on the scale platform. As both of the weights 26 and 28 are adjustable, the weight of cans placed on the scale platform 23 can be accurately determined.

Arranged just above the table is a can feed wheel 29 which is fixed on a vertical shaft 30. This feed wheel 29 is provided with a plurality of radially projecting circumferentially spaced arms 31 which are adapted to engage cans fed to the weighing unit and to intermittently revolve to position them on the scales as will be described. It should be stated that the two scale platforms 23 of each unit are arranged at equal radial distances from the center of the shaft 30.

In order to deliver cans one by one to the feed wheel 29 a timer star wheel 32 is provided which cooperates with a trackway 33 over the conveyor 12 in delivering the cans singly to the feed wheel 29 in timed relation to the intermittent operation thereof.

The mechanism for operating the feed wheel includes a drive shaft 34 (see Fig. 3) having a drive pulley 35 thereon. This shaft through the medium of a pair of bevel gears 36 drives a countershaft 37 which through the medium of intermediate mechanism 38 intermittently drives a third shaft 39. This shaft is provided with a bevel gear 40 for each weighing unit. This bevel gear 40 meshes with a bevel gear 41 fixed on the shaft 30 of each unit, so that operation of the drive shaft will transmit a drive to the feed wheel 29 of each unit, the intermediate mechanism mentioned being such as to render this drive intermittent as will be described.

Figure 6:
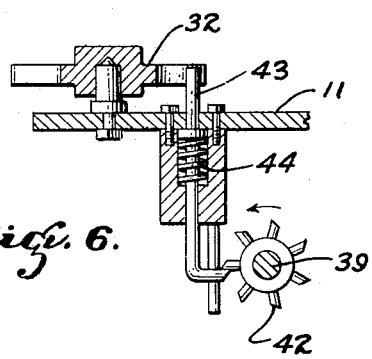
Fig. 6 is a fragmentary view in section disclosing the mechanism for releasing the timer wheel in timed relation to the can feed wheel.

The timer wheel 32 is permitted to operate in synchronism with the feed wheel 29 through the medium of the mechanism disclosed in Fig. 6. This mechanism includes a tripper wheel 42 on the shaft 39, which tripper wheel is adapted to intermittently release the timer wheel 32 so that it may revolve a sufficient amount to enable a single can to enter the weighing unit. By reference to Fig. 6 it will be noticed that the star wheel 32 is freely rotatable on the table 11. A latching member 43 is provided which is normally urged by a spring 44 into a position preventing rotation of the star wheel in a direction enabling a can to enter the weighing unit. The lower end of this latching member 43 is placed in operative relation to the tripper wheel 42 so that each step of advance of the feed wheel 29 will be accompanied by release of the star wheel 32 so that a successive can may be admitted to the machine.

Figure 4:
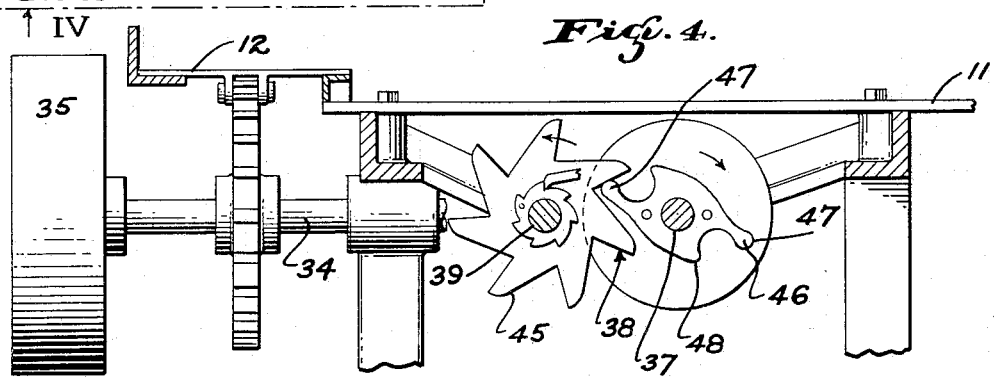
Fig. 4 is an enlarged fragmentary view in vertical section taken on line IV—IV of Fig. 3 and disclosing the mechanism for intermittently driving certain of the mechanism of the machine.
Figure 5:
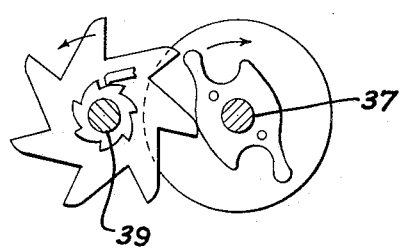
Fig. 5 is a fragmentary view showing the intermittent drive mechanism in a second position.

To intermittently drive the feed wheel and associate mechanism I provide the intermediate mechanism 38, most clearly illustrated in Figs. 4 and 5. This mechanism consists of a large star wheel 45 and a cam 46, the star wheel 45 being secured on the shaft 39 while the cam 46 is secured on the countershaft 37. As this cam 46 is continuously revolved its points so engage the star wheel 45 that the latter is first rotated a predetermined amount in an anti-clockwise direction and then subsequently returned in a clockwise direction a slight distance just a fraction of the amount in which it was turned in the anti-clockwise direction.

Reference had to Fig. 4, it will be seen that the highest point 47 on the cam 46 will engage the star wheel and rotate it in an anti-clockwise direction. When this high point 47 leaves the star wheel, the latter will remain stationary until the low point 48 of the cam 46 engages the tooth of the star wheel immediately following the one just previously engaged by the high point. Such engagement will cause the star wheel to move in a clockwise direction a distance just a fraction of that which it had previously been moved in an anti-clockwise direction. Through the medium of this mechanism the feed wheel 29 and its associated mechanism will be operated in synchronism so that cans will be intermittently delivered to the scale platforms.

It is desirable for the purpose of more accurately weighing cans that the scale platforms be held absolutely stationary during the delivery of a can thereto. For this purpose I provide a latching bar 49 within the housing 20. This latching bar is centrally pivoted as at 50 and is adapted to engage lugs 51 on the rods 24 of the scale platforms. That is, one end of the bar 49 engages the rod of one scale platform while the other end engages the rod of the other scale platform, the ends of the bar 49 being disposed on opposite sides of the rods 24 so that oscillation of the bar 49 will simultaneously engage or disengage the lugs 51 on both the rods 24.

To operate the latching bar it is connected with a short trigger 52 which extends into cooperative relation with a latch wheel 53 secured on the shaft 30. This latch wheel 53 has a plurality of circumferentially spaced projections 54 formed on the upper face thereof for engagement with the trigger 52. These projections 54 may pass under the trigger 52 when the shaft 30 is turning in a clockwise direction but are adapted to engage the end of the trigger 52 and impart endwise movement thereto when the shaft 30 moves in an anti-clockwise direction. Such movement imparted to the trigger 52 will oscillate the latching bar 49 and disengage its ends from the lugs 51, releasing the scales. However after the can has been weighed and the latching wheel 53 again moves in a clockwise direction, the trigger 52 will be released enabling a spring 55 to return the latching bar 49 to latching position relative to the lugs 51 on the rods 24 on the scale platforms.

It will be noticed from Fig. 7 that the lugs 51 and the ends of the latching bar 49 are formed with cam surfaces so that the latching lugs may pass by the latching bar upon upward movement of the scale platforms.

In operation of the device, cans are delivered to the conveyors 12 and 14, which conveyors are driven in any suitable fashion from the drive shaft 34, which conveyors will operate to deliver cans to the guides 33, one row of cans being delivered to the unit 19 while a second row of cans are delivered to the unit 18. When a can approaches the timer wheel 32, the latter is released at the proper time enabling the pressure of the cans to move one can into position to be engaged by the feeder wheel 29. As this feeder wheel advances one-sixth of a turn, it will place the delivered can onto the first scale. As the can is delivered to the scale, the latching bar 49 will be in latching position relative to the lugs 51 so as to hold the scales stationary. Immediately after the can has been placed on the scale, the cam 46 so operates the star wheel 45 that a short anti-clockwise movement is imparted to the shaft 30, causing the feeder wheel to disengage from the can and likewise actuating the latching wheel 53 so that the latching bar 49 will be disengaged from the lugs 51 on the rods 24 of the scale platforms. The scale platform will then, of course, be supported solely by the weights 26 and 28.

If the can is overweight, the scale platform will descend and the successive movement of the feeder wheel will cause the can to move in a depressed trackway 60 formed in the table to a position out of alignment with the feeder wheel 29.

If the can is of correct weight or lighter, the scale will not descend but will remain on the same plane as the table surface. Therefore, subsequent movement of the feeder wheel will advance the can to the second scale.

If the can is of a correct weight this scale will descend so that the can will engage a trackway 61 in the table and be discharged onto the conveyor 14 and conveyed from the machine.

However, if the can is lighter than correct weight, the scale platform will not descend but will remain flush with the table surface and the can will be delivered to a point on the table from which it may be removed for refilling. A track bar 62 cooperates with the feed wheel in delivering the light weight cans to this point.

It is therefore obvious that by means of the present machine cans may be weighed and sorted; that is, heavier than the correct weight will be segregated in one place, cans lighter than the correct weight will be segregated in another place while cans of the correct weight will be delivered continuously through the machine.

It is obvious that although the operating parts of the machine operate intermittently, the operations are extremely rapid so that the machine will have a large capacity.

In the event that one of the units becomes out of order I have provided a clutch mechanism 65 on its shaft 30 so that the machine will cease to operate. This clutch includes a clutch collar 66 having diametrically opposed depressions 67 therein and which is free on the shaft 30. Forming part of the housing 20 is a clutch dog collar 68 having diametrically opposed lugs 69 thereon. During normal operation of the machine the lugs 69 are disposed at ninety degrees to the depressions 67 in the collar 66. However, when it is desired to release the clutch, the depressions 67 are aligned with the lugs 69 releasing the spring 65 so that the driving collar 70 secured on the shaft 30 will no longer impart a drive to the feeder wheel 29.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

In combination with a pair of spaced conveyors, a table disposed between said conveyors and in the same plane with their conveying surfaces, a rotatable feeder wheel on the table, radial arms on said wheel extending over one conveyor as the wheel rotates to engage articles on said conveyor, move them across the table and deposit them on the other conveyor, a balanced scale platform interposed in the path of travel of the articles moving across the table, a depressed trackway adjacent said scale platform whereby articles exceeding a predetermined weight will be guided out of said pathway and remain at rest on the table, a second scale platform in the path of the remaining articles, a depressed trackway between said second scale platform and said other conveyor whereby articles exceeding a minimum weight will be guided to the conveyor and articles of less weight will remain with the feeder wheel, and guide means for moving said cans of less weight free of the feeder wheel to remain at rest on a different part of the table.

JAMES F. PERKINS.